United States Patent [19]

Bowser

[11] 3,791,910

[45] Feb. 12, 1974

[54] MULTIPLE GLAZED UNIT

[75] Inventor: George H. Bowser, New Kensington, Pa.

[73] Assignee: PPG Industries, Inc., Pittsburgh, Pa.

[22] Filed: Mar. 7, 1972

[21] Appl. No.: 232,411

Related U.S. Application Data

[63] Continuation-in-part of Ser. No. 49,779, June 25, 1970, abandoned.

[52] U.S. Cl............................ 161/45, 52/172, 52/309, 52/400, 156/109, 252/194, 260/888
[51] Int. Cl.................................................. E06b 3/66
[58] Field of Search............. 52/172, 309, 398–400; 156/334, 107, 109; 161/203, 193, 44, 45; 260/41 A, 41 B, 41 R, 41.5 R, 41.5 A, 888; 252/194

[56] References Cited
UNITED STATES PATENTS

| | | | |
|---|---|---|---|
| 2,838,809 | 6/1958 | Zeolla et al. | 52/172 |
| 3,387,416 | 6/1968 | Martin | 52/397 X |
| 3,654,005 | 4/1972 | Higgins et al. | 161/203 X |
| 2,306,327 | 12/1942 | Baldwin et al. | 52/172 |
| 2,885,746 | 5/1959 | Guna | 252/194 |
| 2,688,006 | 8/1954 | Steinman | 161/193 |

OTHER PUBLICATIONS

Darnwsis, A., Sealants, Reinhold (1967) pp. 52, 53, 69–73, 76, 77, 83–88.

*Primary Examiner*—Charles E. Van Horn
*Attorney, Agent, or Firm*—Russell A. Eberly

[57] ABSTRACT

Disclosed herein is a room temperature vulcanizable mastic for hermetically sealing multiple glazed units. Also disclosed is a dehydrator element for a multiple glazed unit comprising a desiccant material dispersed in a matrix of moisture vapor transmittable material.

12 Claims, 9 Drawing Figures

MULTIPLE GLAZED UNIT

CROSS-REFERENCE TO RELATED APPLICATIONS

This application is a continuation-in-part of application Ser. No. 49,779, filed June 25, 1970, now abandoned.

BACKGROUND OF THE INVENTION

This invention relates to a novel room temperature vulcanizable mastic material for hermetically sealing multiple glazed window units. The invention also relates to a novel dehydrator element and, more specifically, to a dehydrator element comprising an admixture of a desiccant material and a moisture vapor transmittable matrix material. In particular, the present invention relates to novel, hermetically sealed, multiple glazed window units.

Multiple glazed units generally comprise two or more sheets of glass spaced from one another to provide an insulating air space between the sheets. This air space is effective for reducing the passage of heat through the unit due to conduction and convection. In one typical form of multiple glazed window construction, the sheets of glass are spaced from each other by a metal marginal edge spacer element extending around the periphery of the glass sheets. The glass sheets are generally adhered to the spacer element by a mastic composition forming a continuous film around the marginal edges of the sheets, between each sheet and the spacer element, to provide a primary hermetic seal. The spacer element is generally tubular in shape and filled with a desiccant. Openings in the spacer element communicate between the air space of the unit and the inside tubular portion of the element so that moisture from the air within the unit will be absorbed by the desiccant. A resilient, moisture-resistant strip with a layer of mastic adhered thereto is preferably placed around the peripheral edges of the glass sheets and the spacer element to provide a secondary hermetic seal. A channel member of substantially U-shaped cross-section is also preferably affixed around the periphery of the unit to protect the peripheral edges of the glass sheets forming the unit.

One conventional method of assembling multiple glazed units, as above described, is to apply the layer or bead of mastic that forms the primary hermetic seal along two opposite sides of the metal spacer element, which sides are adapted to engage the inner facing surfaces of the glass sheets about their marginal edges. The spacer element is then placed between two pre-cut glass sheets, and the sheets are pressed together to adhere the sheets to the spacer element and to seal the internal air space between the sheets from the atmosphere. The final air space between the two glass sheets is a function of the thickness of the spacer element and the thickness of the mastic layers between each side of the spacer element and the adjacent glass sheet.

A layer of mastic or a resilient, moisture-resistant strip with a layer of mastic adhered thereto is then placed around the peripheral edges of the glass sheets and the spacer element to form the secondary hermetic seal. A channel member made of metal, such as stainless steel, is thereafter affixed around the periphery of the unit. The angle that the flanges or sides of the channel member form with the central or web portion of the channel member is slightly less than 90 degrees. When the channel member is affixed to the edges of the glass sheets, these sides are held apart to allow the glass to be inserted therebetween. These sides are then released and they spring back into contact with the faces of the glass sheets. The channel member is thus held on under tension. The foregoing and other similar types of multiple glazed window construction are fully disclosed in U.S. Pat. Nos. 2,838,810, 2,964,809 and 3,280,523.

A number of vexing manufacturing problems are encountered in producing multiple glazed units of the general type of construction hereinabove described. Principal among these problems is the inherent difficulty of adapting this type of construction to the production of units having non-linear or curved peripheral edge portions. In this regard, a multiple glazed unit can generally be characterized as being either a standard unit, on one hand, or a "pattern" or non-standard unit on the other. A standard unit, as the term is used herein, is simply a flat, rectangular, stock-size unit. Pattern or non-standard units, on the other hand, encompass all of the possible variations from standard, flat, rectangular stock-size units, and include, but are not limited to, non-planar units, non-rectangular units and units provided with one or more curved peripheral edge portions.

Generally, in the manufacture of both standard and pattern multiple glazed units of the type described, a plurality of sections of metallic tubular spacer material are filled with a desiccant and are adjoined at their ends to conform to the perimetrical shape of the unit being produced. In producing a standard multiple glazed unit, four straight sections of tubular spacer material are used and are adjoined at right angles at their ends to form a substantially flat, rectangular spacer element of the desired stock size. In fabricating a pattern multiple glazed unit, on the other hand, the unit design, and accordingly the spacer element, is not restricted to stock size or to a substantially flat, rectangular shape. Thus, sections of tubular spacer material may be joined at an angle other than 90° and/or one or more tubular spacer sections may be pattern-bent or otherwise shaped to conform to the perimetrical contour of pattern-cut and/or pattern-bent glass sheets forming a part of the pattern unit.

It will be apparent from the foregoing that the construction of pattern multiple glazed units greatly increases the normal problems encountered in multiple glazed window construction of the type described. Special jigs and fixtures are frequently required; special handling is required; and units having curved peripheral edge portions require bending the metallic tubular spacer element to conform to the desired contour of the unit. When a concave or convex unit is desired, it is essential that the bent spacer element have a radius of curvature matching that of the glass sheets to ensure uniform thickness of the unit, a good hermetic seal, and to preclude the possibility of imparting any undesired stresses to the glass sheets. Thus, it will be apparent that there is a need for a marginal edge spacer that can be readily used to produce standard, flat, rectangular, stock-size multiple glazed units and that can also be readily bent, shaped, joined or otherwise conformed to any desired perimetrical contour for pattern multiple glazed units. The dehydrator element of the present invention may be used to provide, or serve as part of, just such a spacer. Also, the novel room temperature curable mastic material of this invention may be advantageously used to further enhance the manufacture and construction of multiple glazed window units, including both the above-described prior art type of units as well as the type of units disclosed hereinbelow.

These and other objects, features and advantages of the present invention will become more apparent from that which follows when taken in conjunction with the drawings, in which.

Figure 1:
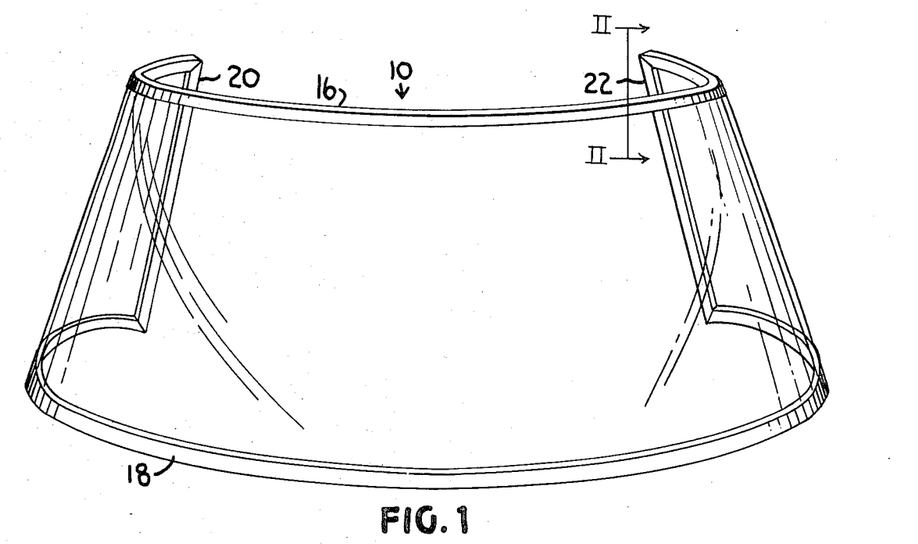
FIG. 1 is a perspective view of a multiple glazed unit embodying the principles of this invention.
Figure 2:
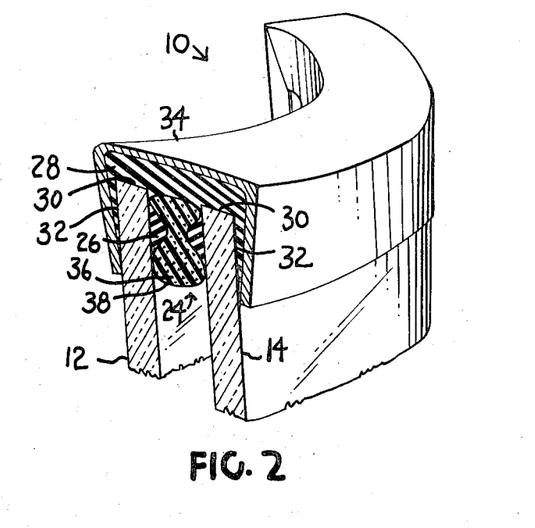
FIG. 2 is a fragmentary view, partly in section, along the line II—II of FIG. 1.

In the drawings, and with particular reference to FIGS. 1 and 2, there is shown a typical pattern, multiple glazed unit 10 comprised of two bent sheets of glass 12 and 14 arranged in parallel relationship and spaced from one another to provide an insulating air space between the sheets. The glass sheets 12 and 14 may be tempered, colored, laminated, or have other special strength or optical properties. As shown, multiple glazed unit 10 is convex in shape and has a curved upper edge 16, a curved lower edge 18 and straight side edges 20 and 22.

As best shown in FIG. 2, the glass sheets 12 and 14 are separated at their marginal edges by a continuous dehydrator element 24, which in this case also serves as part of the entire spacer element. The dehydrator element 24 has an essentially dog-bone cross-sectional shape and is adhered to the glass sheets 12 and 14 at their interfaces by means of a continuous film or bead of an adhesive, moisture-resistant, mastic composition 26. In addition, a bead or layer of moisture-resistant, mastic composition 28 is adhered or bonded to the peripheral edge of dehydrator element 24, the peripheral edges 30 of the glass sheets and marginal edge portions 32 of the outer faces of the glass sheets. Mastic compositions 26 and 28 extend completely around the perimeter of the unit and may be composed of the same material or dissimilar materials. A channel member 34 of essentially U-shaped cross-section also extends completely around the perimeter of the unit to protect its edges. Channel member 34 is generally composed of several sections of channeling that are joined or butted together at their ends. Where desired, a strip of adhesive tape (not shown) may be applied in longitudinal, surrounding relation with the outer surfaces of channel member 34. A preferred construction and method of attachment for channel member 34, for use with certain pattern units, are fully disclosed in application Ser. No. 706,896, filed Feb. 20, 1968, by T. H. Hughes, and assigned to the assignee of the present invention.

Dehydrator element 24 forms the basis for one aspect of the present invention. Dehydrator element 24 is composed of a desiccant material 36 dispersed in a moisture vapor transmittable matrix material 38. Desiccant used according to this invention include those stable materials commonly used for this purpose and should generally be construed to include materials capable of picking up from the atmosphere in excess of 5 to 10 percent of its weight, preferably in excess of 10 percent of its weight, in moisture (water). In accordance with this invention, the moisture vapor transmittable matrix material 38 functions to provide the required communication between the air space of the unit 10 and the desiccant material 36, so that moisture from the air within the unit will be adsorbed by the substantially uniformly dispersed desiccant. In addition to being a moisture vapor transmittable material, matrix material 38 is preferably also a material that is flexible or readily conformable at room temperature to any shape or contour that may be desired.

The preferred type or class of desiccant materials that may be used in the practice of this invention, and which are now covered by composition of matter patents, are the synthetically produced crystalline metal aluminosilicates or crystalline zeolites. A specific example of a synthetically produced crystalline zeolite that is particularly satisfactory and which is covered by U.S. Pat. Nos. 2,882,243 and 2,882,244 is Linde Molecular Sieve 13X, in powdered form, produced by Union Carbide Corporation. However, other desiccant or adsorbent materials, preferably in pulverulent form or which disintegrate into pulverulent form when dispersed in the matrix, may also be used, such as anhydrous calcium sulfate, activated alumina, silica gel and the like.

The preferred type or class of matrix materials or moisture vapor transmittable materials that may be employed in connection with this invention are the family of thermoplastic elastomers comprising block copolymers of styrene and butadiene, such as are now disclosed in U.S. Pat. No. 3,265,765. A specific example of a particularly suitable thermoplastic block copolymer of styrene and butadiene is Thermolastic 226 produced by Shell Chemical Company. However, other thermoplastic moisture vapor transmittable materials, as well as moisture vapor transmittable thermosetting materials and vulcanizable materials, may also be used.

In accordance with the present invention, it is only essential that the particular matrix material being used is capable of transmitting moisture vapor and is also capable of functioning as a matrix material for the particular desiccant employed. In order that adsorption by a desiccant dispersed therein can proceed at a reasonable rate, the moisture vapor transmittable material selected should desirably have a substantial water vapor transmission which for most purposes should be above about 15 gm./24 hr./1 sq. meter/mil at 100°F., 90 percent R.H., as determined by the Standards Methods of Test for Water Vapor Transmission of Materials in Sheet Form, ASTM Designation E-96-66 Method E.

Preferably, however, the water vapor transmission of the matrix material used should be above about 40 gm./24 hr./1 sq. meter/mil at 100°F., 90 percent R.H. Particularly good results are achieved when the water vapor transmission of the matrix material selected is above about 50 gm./24 hr./1 sq. meter/mil at 100°F., 90 percent R.H. The water vapor transmission of Thermolastic 226 is about 55 gm./24 hr./1 sq. meter/mil at 100°F., 90 percent R.H.

Examples of materials in addition to Thermolastic 226 having the foregoing desired characteristics include: polyacrylate elastomers, conjugated diene polymers and copolymers such as natural rubber, polybutadiene, polyisoprene, acrylonitrile-butadiene copolymers, polybutadiene elastomers, silicone elastomers, urethane elastomers, as well as epoxy resins, polyester resins, polyamide resins, phenolic resins, urea-formaldehyde resins, cellulose acetate resins, polycarbonate resins, polystyrene resins, polyvinyl alcohol resins, vinyl chloride-vinyl acetate copolymers, ethylene-vinyl acetate copolymers and the like or other materials, particularly resinous materials which provide a continuous phase, preferably flexible in character, in which the desiccant may be dispersed and which are themselves water permeable to an appreciable degree. The matrix may be vulcanizable or unvulcanizable, and if vulcanizable may be used and stored for use in the vulcanized or unvulcanized state. Vulcanizing or curing agents may be introduced if desired, but preferably they are omitted.

EXAMPLE I

In accordance with the present invention, a dehydrator element 24 was prepared in the following manner and having the following composition:

| INGREDIENT | PARTS BY WEIGHT |
|---|---|
| Thermolastic 226 | 100 |
| Linde Molecular Sieve 13X | 50 |
| Carbon black (Statex G) | 5 |

Pellets of the Thermolastic 226 were added to a two-roll mill heated to a temperature of about 250°F. The pellets were allowed to soak approximately 5 minutes before the mill was turned on. The pellets were then thoroughly milled until a uniform sheet of the material was formed. Powdered Linde Molecular Sieve 13X was added slowly to the sheet of Thermolastic 226 and, after the addition of all of the molecular sieve material, the resultant sheet was stripped and returned to the mill at least five times. This process of addition of material, stripping and returning to the mill was then repeated with the addition of the carbon black. Carbon black is used merely as an opacifying agent and its use is not essential to this invention. The completed composition was removed from the mill and cut into ½ inch strips which were stored in a sealed container in preparation for subsequent extrusion to the desired shape.

A die was selected to provide the desired shape for the dehydrator element. This die was placed in a Killion 100 extruder. The barrel of the extruder was heated to approximately 250°F. and the die was heated to approximately 240° to 260°F. The extruder screw speed setting was approximately 2.5. The previously prepared ½ inch strips of material having the desired composition for the dehydrator element were then added to the feed hopper and extruded to the desired shape.

The following are typical properties of Thermolastic 226 and Linde Molecular Sieve 13X:

THERMOLASTIC 226

| | |
|---|---|
| Low temperature flexibility °F. to Young's modulus of 10,000 psi. | −83 55 |
| Tensile strength[a] at break, psi. | 650 |
| Modulus[a] at 300% extension, psi. | 275 |
| Elongation[a] at break, % | 740 |
| Set[a] at break, % | 15 |
| Elongation/set | 50 |
| Hardness, Shore A | 45 |
| Yerzley resilience,[b] % | 78 |
| Falling ball rebound, % | 65 |
| Specific gravity[c] | 1.00 |
| Melt index[d] g/10 min. | |
| G | 90 |
| E | 20 |

[a] "D" die specimen extended at 200%/min., 23°C.
[b] At 20% deflection, 23°C.
[c] Measured using air pycnometer, 23°C.
[d] ASTM D-1238

LINDE MOLECULAR SIEVE 13X

| Nominal Pore Diameter (Angstroms) | Form | Bulk Density (lb./cu.ft.) | Heat of Adsorption (max.) (btu/lb.H₂O) | Equilibrium H₂O Capacity (% Wt.)* | Molecules Adsorbed |
|---|---|---|---|---|---|
| 10 | Powder | 30 | 1800 | 36 | Molecules with an effective diameter <10 angstroms |

* Lbs. H₂O/100 lbs. activated adsorbent at 17.5 mm Hg. 25°C.

Moisture adsorption tests run on the powdered Linde Molecular Sieve 13X, as received, and the spacer-dehydrator element of Example I showed that, at 140°F. and 96 percent relative humidity, the desiccant in both samples adsorbed approximately the same per-

TABLE 1

WATER ADSORPTION TEST

| Dehydrator | Per Cent Increase in Moisture | | |
|---|---|---|---|
| | 19 hours | 142 hours | 15 days |
| Powdered Linde Molecular Sieve 13X (as received) | 27.02 | 27.24 | 27.26 |
| Composition of Example I | 13.81 | 23.28 | 27.18 | cent moisture, i.e., 27.2 percent by weight based on the weight of desiccant.

As will be noted, the dehydrator element required approximately 15 days to saturate the desiccant while the powdered material, as received, became essentially saturated within 24 hours. From the foregoing, it has been calculated that no more than 0.3 percent by weight of Linde Molecular Sieve 13X, based on the weight of the ingredients of Example I, is required to obtain a dew point of 0°F. in a multiple glazed unit fabricated at 70°F., 90 percent R.H. and measuring 14 inches by 20 inches with the glass sheets spaced ¼ inch apart by a ¼ inch × 5/16 inch spacer extending completely around the periphery of the unit. Furthermore, by increasing the parts by weight of powdered Linde Molecular Sieve 13X added to the Thermolastic 226 ingredient of Example I, it has been determined that at least as much as 60 percent by weight of desiccant based on the total weight of the ingredients can be dispersed in Thermolastic 226.

Adhesive, moisture-resistant, e.g., air impermeable, mastic compositions 26, 28 that have been successfully used in the practice of this invention include pre-cured materials, such as disclosed in U.S. Pat. No. 2,974,377, thermoplastic materials, such as disclosed in Handbook of Adhesives, Chapter 36, entitled "Hot-Melt Adhesives," Reinhold Publishing Corp., 1962, and room temperature curable materials, such as disclosed in U.S. Pat. No. 3,076,777. Room temperature curable or vulcanizable materials that cold flow to form a seal and cure to form a resilient structural bond are particularly desirable for use with this invention.

Shown in FIGS. 3 through 9 are a number of specific, alternative embodiments of the present invention. The construction of FIG. 3 differs, for example, from the construction of FIG. 2 in that, in lieu of providing a bead or layer of mastic 28 around the periphery and marginal edge portions of the unit as described in connection with FIG. 2, a resilient, moisture-resistant, plastic strip 40 with a layer of mastic 28 adhered thereto is placed around the peripheral edges of the glass sheets 12 and 14 and the dehydrator element 24. A channel member 34 is thereafter affixed around the periphery of the unit.

Figure 3:
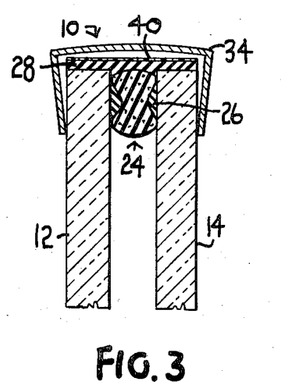
FIG. 3 is a fragmentary sectional view similar to FIG. 2, showing details of one preferred embodiment of this invention.
Figure 4:
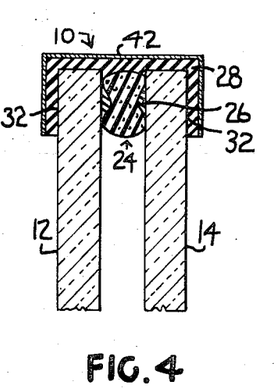
FIG. 4 is a fragmentary sectional view similar to FIG. 2, showing details of a second preferred embodiment of this invention.

In the construction of FIG. 4, like that of FIGS. 2 and 3, dehydrator element 24 is adhered by mastic 26 to the marginal edges of the glass sheets 12 and 14. A strip of aluminum foil 42 with a layer of mastic 28 adhered thereto is placed around the peripheral edges of the glass sheets 12 and 14 and the dehydrator element 24, as well as around marginal edge portions 32 of the outer facing surfaces of the glass sheets.

Figure 5:
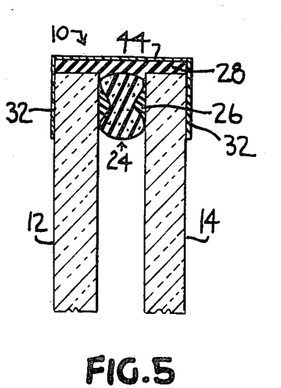
FIG. 5 is a fragmentary sectional view similar to FIG. 2, showing details of a third preferred embodiment of this invention.

In the construction of FIG. 5, in lieu of using aluminum foil, such as shown in FIG. 4, a pressure-sensitive strip 44 with a layer of mastic 28 adhered thereto is placed around the peripheral edges of the glass sheets 12 and 14 and the dehydrator element 24. As shown, mastic 28 terminates at the outer facing surface of each of the glass sheets and the pressure-sensitive strip 44, which is wider than the thickness of the finished unit 10, is turned down and adhered to marginal edge portions 32 of these outer facing glass sheet surfaces.

Figure 6:
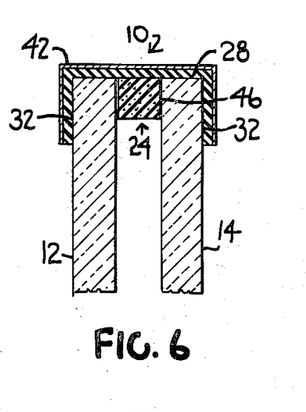
FIG. 6 is a fragmentary sectional view similar to FIG. 2, showing details of a fourth preferred embodiment of this invention.

Shown in FIG. 6 is another alternative embodiment of this invention wherein a strip of aluminum foil 42 is provided with a layer of mastic 28 and a rectangular dehydrator element 24 is either extruded directly onto or, after formation, is placed onto the mastic material 28. The dehydrator element readily adheres to the mastic 28. The sides of dehydrator element 24 are primed with a thin coating of a rubber-base adhesive 46 and dehydrator element 24 is then placed between opposed marginal edges of a pair of glass sheets 12 and 14. The lateral edges of the foil strip are adhered by the mastic layer 28 around marginal edge portions 32 of the outer facing surfaces of the glass sheets.

Figure 7:
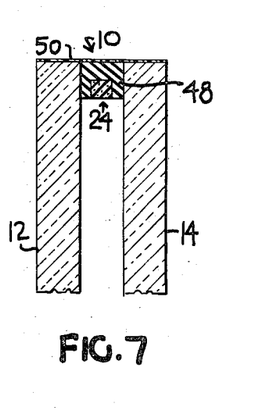
FIG. 7 is a fragmentary sectional view similar to FIG. 2, showing details of a fifth preferred embodiment of this invention.

In FIG. 7 there is shown a further alternative embodiment of this invention. In the embodiment of FIG. 7, a mastic, spacer-sealant element 48, of the same or similar composition as mastic 26 or mastic 28 of previous embodiments, is disposed between opposed marginal edges of the inner facing surfaces of the glass sheets 12 and 14 and carries an insert of dehydrator material 24. This insert 24 is in communication with the air space between the glass sheets. A strip of metal foil or plastic sheeting 50 having a pressure-sensitive coating is disposed around the peripheral edges of the glass sheets and the mastic, spacer-sealant element 48.

Figure 8:
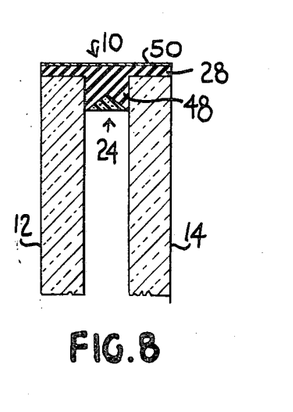
FIG. 8 is a fragmentary sectional view similar to FIG. 2, showing details of a sixth preferred embodiment of this invention.

The embodiment of FIG. 8 is similar to that of FIG. 7 except that in this embodiment a triangular insert of dehydrator material 24 rather than a rectangular insert is used. Also, spacer-sealant element 48 is T-shaped and the arms of the tee extend across the peripheral edges of the glass sheets in the manner of mastic 28 of previous embodiments. Furthermore, in this embodiment the strip of metal foil or plastic sheeting 50 is not provided with a pressure-sensitive coating, since either the metal foil or the plastic sheeting will readily adhere to the mastic material of which spacer-sealant element 48 is composed.

Figure 9:
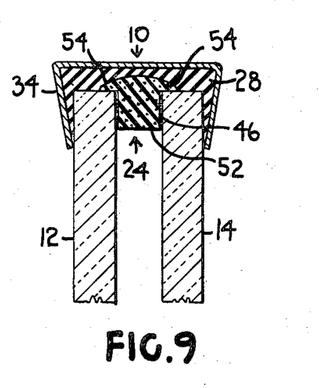
FIG. 9 is a fragmentary sectional view similar to FIG. 2, showing details of a seventh preferred embodiment of this invention.

Shown in FIG. 9 is a still further embodiment of this invention. In this emobodiment, the dehydrator element 24 is essentially T-shaped in cross-section. As shown, dehydrator element 24 has a rectangular leg portion 52 which is disposed between marginal edges of a pair of glass sheets 12 and 14 to space the sheets apart. The sides of dehydrator element 24 are primed with a thin coating of a rubber-base adhesive 46. Each arm 54 of this member is disposed in contact with and extends for a short distance across an adjacent peripheral edge portion of one of the glass sheets. As will be apparent, arms 54 provide reference ledges for properly locating element 24 with respect to the glass sheets. Also, arms 54 resist or preclude the possibility of inserting or forcing any portion of element 24 inwardly of the peripheral edge of the unit 10 further than is desired. As in FIG. 2, a layer or bead of moisture-resistant mastic 28 and a channel member 34 each extend around the perimeter of the unit to complete its structure.

In accordance with this invention, rectangular test specimens were constructed measuring 14 inches by 20 inches and comprised of two sheets of ⅛ inch glass separated by an air space of ¼ inch ± 3/32 inch. Each specimen had an initial dew point of −60°F. or lower. The following tests were conducted with the results being indicated in each case.

HIGH HUMIDITY TEST

Test specimens were exposed for a continuous 60 day period to ambient atmospheric conditions maintained at 110°F. and 90 percent relative humidity. A specimen was considered to pass this test if, at the end of the 60 day exposure period, the dew point of the specimen was −60°F. or lower.

| Unit Design | Unit No. | Dew Point, °F. | | | Remarks |
|---|---|---|---|---|---|
| | | Initial | 30 days | 60 days | |
| FIG. 6 | 1 | −60 | −60 | −60 | Passed Test |
| FIG. 6 | 2 | −60 | −60 | −60 | Passed Test |
| FIG. 6 | 3 | −60 | −60 | −60 | Passed Test |
| FIG. 6 | 4 | −60 | −60 | −54 | Acceptable |

TEMPERATURE CYCLING AND HIGH HUMIDITY TEST

Test specimens were exposed to an ambient atmosphere maintained at 90 percent relative humidity and were gradually heated to 120°F. ± 5°, during a 3 hour period, followed immediately by gradual cooling to 20°F. ± 5°, during a 3 hour period. A specimen was considered to pass the test if, after at least 300 cycles, the dew point of the specimen was −60°F. or lower.

| Unit Design | Unit No. | Dew Point, °F. | | | | Remarks |
|---|---|---|---|---|---|---|
| | | Initial | 120 cycles | 240 cycles | 360 cycles | |
| FIG. 6 | 9 | −60 | −60 | −60 | −60 | Passed Test |
| FIG. 6 | 10 | −60 | −60 | −60 | −60 | Passed Test |
| FIG. 6 | 11 | −60 | −60 | −58 | −60 | Passed Test |
| FIG. 6 | 12 | −60 | −60 | −58 | −60 | Passed Test |

ULTRAVIOLET EXPOSURE AND CYCLING

Test specimens were exposed for a continuous period of 500 hours to ultraviolet radiation. Glass temperature, as measured at corner surface areas of the specimens, was controlled so as not to exceed 120°F. A specimen was considered to pass the ultraviolet exposure phase of this test if, after 500 hours, the dew point of the specimen was −60°F. or lower.

Immediately upon completion of the ultraviolet exposure phase of this test, the specimens were exposed to the above-described Temperature Cycling and High Humidity Test for a period of 60 continuous cycles. A specimen was considered to pass the complete test if, after 60 cycles of the Temperature Cycling and High Humidity Test, the dew point of the specimen was −60°F. or lower.

ment having elastomeric properties. The use of an elastomeric or flexible dehydrator element is considered to be particularly desirable in the furtherance of this invention because it can be readily used to produce a marginal edge spacer for standard multiple glazed units and can also be readily bent, shaped, notched, joined or otherwise conformed to any desired perimetrical contour for use in the construction of pattern multiple glazed units. As the test results indicate, multiple glazed units constructed in accordance with this invention perform extremely well under even the most severe conditions of test.

In a further aspect of this invention, a particularly suitable room temperature vulcanizable mastic has been found which may be advantageously used for hermetic sealant 26 and/or hermetic sealant 28. This novel room temperature vulcanizable sealant has the following composition:

| INGREDIENT | PERCENT BY WEIGHT |
|---|---|
| Butyl rubber | 18 to 65 |
| Polyisobutylene | 8 to 60 |
| Polybutene | 15 to 65 |
| Carbon black | 0 to 20 |
| Silica pigment | 2 to 30 |
| Lead dioxide | 0.4 to 3.5 |
| Zinc oxide | 2.5 to 5 |
| Silica pigment with hydroxy groups | 1 to 5 |
| Paraquinone dioxime | 0.2 to 1.6 |

Because the above composition cures slowly at room

| Unit Design | Unit No. | Ultraviolet Exposure Dew Point, °F. | | Temperature Cycling and High Humidity Dew Point, °F. | | Remarks |
|---|---|---|---|---|---|---|
| | | Initial | 500 Hours | Initial | 60 cycles | |
| FIG. 6 | 5 | −60 | −60 | −60 | −60 | Passed Test |
| FIG. 6 | 6 | −60 | −60 | −60 | −60 | Passed Test |
| FIG. 6 | 7 | −60 | −60 | −60 | −60 | Passed Test |
| FIG. 6 | 8 | −60 | −60 | −60 | −60 | Passed Test |

The composition of the dehydrator element, employed as a marginal edge spacer component in the foregoing tests, was that of Example I. As mentioned previously, this composition produces a dehydrator element temperature, the components should be kept in two or more batches which will not self cure. The batches can then be combined and extruded to the desired shape. Perferably, the ingredients are kept in two batches and comprise component A and component B as designated below:

| Ingredient | Percent by Weight Broad Range | Percent by Weight Preferred Range |
| --- | --- | --- |
| Butyl rubber | 18 to 65 | 18 to 35 |
| Polyisobutylene | 8 to 60 | 8 to 20 |
| Polybutene | 15 to 65 | 15 to 35 |
| Carbon black | 0 to 40 | 0 to 20 |
| Silica pigment | 2 to 30 | 2 to 15 |
| Lead dioxide | 0.8 to 7 | 0.8 to 3.2 |
| Silica pigment with hydroxy groups | 1 to 5 | 2.0 to 4.0; | the percentage by weight being based on the total weight of component A;
and component B comprises:

| Ingredient | Percent by Weight Broad Range | Percent by Weight Preferred Range |
| --- | --- | --- |
| Butyl rubber | 18 to 65 | 18 to 35 |
| Polyisobutylene | 10 to 60 | 10 to 18 |
| Polybutene | 15 to 65 | 15 to 35 |
| Silica pigment | 2 to 30 | 2 to 15 |
| Silica pigment with hydroxy groups | 1 to 5 | 2.0 to 4.0 |
| Zinc oxide | 5 to 10 | 5 to 10 |
| Paraquinone dioxime | 0.4 to 3.5 | 0.4 to 1.6; | the percentage by weight being based on the total weight of component B.

A specific example of a mastic of the foregoing composition is as follows:

| Ingredient | Mastic Composition I Component A Per Cent by Weight | Component B Per Cent by Weight |
| --- | --- | --- |
| Butyl rubber Mooney Viscosity ML (1 + 8 min.) at 212°F., Min. 41, Max. 49 Mol % Unsaturation 1.2 Molecular Weight 350,000 | 19.2 | 19.2 |
| Polyisobutylene (Enjay Vistanex LM,MS, Molecular Weight 10,000 – 15,000) | 16 | 16 |
| Polybutene (California Chemical Oronite 32, Molecular Weight 1,200) | 26.1 | 26.7 |
| Carbon black (Columbia Carbon Statex G) | 14.1 | — |
| Silica pigment (PPG Industries Hi Sil 233) | 8.8 | 8.8 |
| Zinc oxide (New Jersey Zinc XX4 grade) | — | 8.8 |
| Silica pigment with hydroxy groups (PPG Industries TK-800) | 2.1 | 2.1 |
| Zirconium silicate (National Lead TAM Superpax) | 8.8 | 14.4 |
| Lead dioxide | 2.8 | — |
| Paraquinone dioxime (Naugatuck Chemical GMF) | — | 1.4 |
| γ-Glycidoxy propyltrimethoxy silane (Dow Corning Z-6040) | 0.35 | 0.35 |
| Butadiene polymer containing two hydroxy groups per mol (Sinclair Petrochemical Poly-BDR-45M) | 1.7 | 1.8 |

The ingredients of component A and component B were separately milled to homogeneous batch mixes on a water cooled rubber compounding mill. Care was taken when adding the lead dioxide to component A that the component A batch mix was below 250°F. and thereafter maintained below 250°F. The components as compounded have unlimited shelf life. After milling, substantially equal portions of component A and component B were thoroughly mixed and extruded in both bead and ribbon form. The extruded sealant cures or vulcanizes slowly at room temperature and attains a substantially full cure in about 2 weeks. It has been found that this extruded sealant will cold flow and forms an excellent, resilient structural bond with glass, wood and metal, among other materials, upon curing.

However, while the physical properties and handling characteristics of the above-described sealant composition appear excellent for use as a hermetic sealant for multiple glazed units, it has been found that its adhesion to the novel dehydrator element of Example I is practically nil and that its adhesion can be substantially enhanced by the use of the following dehydrator composition:

EXAMPLE II

| Ingredient | Percent by Weight |
| --- | --- |
| Styrene-butadiene rubber block copolymer (Thermolastic 226 or Kraton 3200-9000-0*) | 64 |
| Ethylene ethyl acrylate copolymer (Union Carbide DPDB 6169) | 16 |
| Molecular sieve (powdered) | 20 |

* Kraton 3200-9000-0 is a block copolymer of styrene and butadiene rubber, manufactured by Shell Chemical Company, containing a black opacifier.

The dry ingredients of Example II are thoroughly blended together in a container, introduced directly into the feed hopper of the extruder of Example I and extruded to the desired dehydrator shape. Adhesion tests using the mastic of this invention were conducted as follows:

ADHESION TEST

Test specimens were made using a 1/16 inch bead of Mastic Composition I to seal the ¼ inch sides of a ¼ inch × 7/32 inch × 4 inch spacer between two pieces of glass measuring 3/16 inch × 1 inch × 4 inches. The sandwich-like test specimens were pressed lightly to provide a sealant thickness of approximately 0.01 inch on each side of the spacer. The spacer materials used were aluminum, the dehydrator composition of Example I and the dehydrator composition of Example II. Representative test specimens of each spacer material were left at room conditions, e.g., 75°F., until the mastic composition vulcanized and like test specimens were placed in an oven and subjected to the following heat cycle to accelerate cure or vulcanization of the mastic composition:

1 hour at 100°F.
1 hour at 120°F.
22 hours at 140°F.
6 days at 180°F.

Each specimen was then pulled in a tensile tester at 0.1 inches per minute crosshead speed. The following results were obtained:

| Spacer | Cure | Avg. Tensile Strength, psi. | Avg. Elongation, Per Cent Based on Thickness of Seal |
|---|---|---|---|
| Aluminum | Oven | 99.2 | 930 |
| Aluminum | Room Temperature | 42 | 185 |
| Composition of Example I | Oven | >1 | >1 |
| Composition of Example I | Room Temperature | >1 | >1 |
| Composition of Example II | Oven | 67.7 | 305 |
| Composition of Example II | Room Temperature | 46.4 | 425 |

Established requisites for this adhesion test for sealants used in multiple glazed units are that no specimen shall fail at tension of less than 32 psi. or more than 250 psi. and that no specimen shall fail with less than 100 percent elongation based on the thickness of the seal. As will be evident from the above test results, the mastic composition of this invention fulfills both of the foregoing requisites when used to seal either a metallic spacer material to glass or a spacer material of the composition of Example II.

Although the present invention has been described with particular reference to the specific details of certain embodiments thereof, it is not intended that such details shall be regarded as limitations upon the scope of the invention except insofar as included in the accompanying claims.

I claim:

1. A multiple glazed unit comprising a pair of spaced, parallel, glass sheets separated by a marginal edge spacer and a room temperature vulcanizable sealant adhered to said spacer and said glass sheets to hermetically seal the unit, said sealant being substantially solvent-free and consisting essentially of an admixture of substantially equal portions of Component A and Component B, wherein prior to mixing Component A comprises:

butyl rubber — 18 to 35 percent by weight
polyisobutylene — 8 to 20 percent by weight
polybutene — 15 to 35 percent by weight
carbon black — 0 to 20 percent by weight
silica pigment — 4 to 19 percent by weight
lead dioxide — 0.8 to 3.2 percent by weight;

the percentage by weight being based on the total weight of Component A; and Component B comprises:

butyl rubber — 18 to 35 percent by weight
polyisobutylene — 10 to 18 percent by weight
polybutene — 15 to 35 percent by weight
silica pigment — 4 to 19 percent by weight
zinc oxide — 5 to 10 percent by weight
paraquinone dioxime — 0.4 to 1.6 percent by weight;

the percentage by weight being based on the total weight of Component B.

2. A multiple glazed unit according to claim 1 wherein said spacer is comprised of metal.

3. A multiple glazed unit according to claim 1 wherein said spacer is comprised of a desiccant material dispersed in a matrix of moisture vapor transmittable material containing ethylene ethyl acrylate copolymer.

4. A multiple glazed unit comprising a pair of spaced, parallel, glass sheets separated by a marginal edge spacer and a room temperature vulcanizable sealant adhered to said spacer and said glass sheets to hermetically seal the unit, said sealant being substantially solvent-free and consisting essentially of an admixture of Component A and Component B, wherein prior to mixing Component A comprises:

butyl rubber — 18 to 65 percent by weight
polyisobutylene — 8 to 60 percent by weight
polybutene — 15 to 65 percent by weight
carbon black — 0 to 40 percent by weight
silica pigment — 3 to 35 percent by weight
lead dioxide — 0.8 to 7 percent by weight;

the percentage by weight being based on the total weight of Component A; and Component B comprises:

butyl rubber — 18 to 65 percent by weight
polyisobutylene — 10 to 60 percent by weight
polybutene — 15 to 65 percent by weight
silica pigment — 3 to 35 percent by weight
zinc oxide — 5 to 10 percent by weight
paraquinone dioxime — 0.4 to 3.5 percent by weight;

the percentage by weight being based on the total weight of Component B.

5. A multiple glazed unit according to claim 4 wherein said spacer is comprised of metal.

6. A multiple glazed unit according to claim 4 wherein said spacer is comprised of a desiccant material dispersed in a matrix of moisture vapor transmittable material containing ethylene ethyl arcylate copolymer.

7. A multiple glazed unit comprising a pair of spaced, parallel, glass sheets separated by a marginal edge spacer and a room temperature vulcanizable sealant adhered to said spacer and said glass sheets to hermetically seal the unit, said sealant being substantially solvent-free and consisting essentially of:
butyl rubber — 18 to 65 percent by weight
polyisobutylene — 8 to 60 percent by weight
polybutene — 15 to 65 percent by weight
carbon black — 0 to 20 percent by weight
silica pigment — 3 to 32 percent by weight
lead dioxide — 0.4 to 3.5 percent by weight
zinc oxide — 2.5 to 5 percent by weight
paraquinone dioxime — 0.2 to 1.6 percent by weight.

8. A multiple glazed unit according to claim 7 wherein said spacer is comprised of metal.

9. A multiple glazed unit according to claim 7 wherein said spacer is comprised of a desiccant material dispersed in a matrix of moisture vapor transmittable material containing ethylene ethyl acrylate copolymer.

10. A mutliple glazed unit according to claim 7 wherein said sealant further comprises from about 0 to 30 percent by weight of zirconium silicate.

11. A multiple glazed unit according to claim 7 wherein said sealant further comprises from about 0.1 to about 5 percent by weight of an organo-silane.

12. The multiple glazed unit according to claim 7 wherein said sealant further comprises from about 1 to about 10 percent by weight of butadiene polymer containing two hydroxy groups per mole.

* * * * *

UNITED STATES PATENT OFFICE
CERTIFICATE OF CORRECTION

Patent No. 3,791,910         Dated February 12, 1974

Inventor(s) George H. Bowser

It is certified that error appears in the above-identified patent and that said Letters Patent are hereby corrected as shown below:

In "References Cited", "Guna" should be --Gura--.

Under "Other Publications", "Darnwsis" should be --Damusis--.

Column 1, line 8, after "abandoned" change the period (.) to a comma (,) and insert --which in turn is a continuation-in-part of application Serial No. 878,454, filed November 20, 1969, now abandoned, which latter application is a division of application Serial No. 749,758, filed August 2, 1968, now abandoned. This application claims priority only for common subject matter disclosed in said earlier filed applications.--

Column 1, line 37, "absorbed" should be --adsorbed--.

Column 6, in the table entitled "THERMOLASTIC 226", line 1 of the table, "-83 55" should be -- -55 --.

Column 8, line 37, "emobodiment" should be --embodiment--.

Column 8, line 41, after "between" insert --opposed--.

Column 10, line 68, "Perferably" should be --Preferably--.

Signed and sealed this 9th day of July 1974.

(SEAL)
Attest:

McCOY M. GIBSON, JR.
Attesting Officer

C. MARSHALL DANN
Commissioner of Patents